US006430581B1

(12) United States Patent
Mahoney et al.

(10) Patent No.: US 6,430,581 B1
(45) Date of Patent: Aug. 6, 2002

(54) AUTOMATED COURT DOCUMENT DOCKETING FILING SYSTEM

(75) Inventors: Patrick D. Mahoney, New Rochelle, NY (US); Terrence M. Doeberl, West Redding, CT (US); Ronald P. Sansone, Weston, CT (US); Ronald Reichman, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/058,026

(22) Filed: Apr. 10, 1998

(51) Int. Cl.[7] .......................... G06F 15/00; G06F 17/21

(52) U.S. Cl. ........................ 707/500; 705/407; 235/375

(58) Field of Search ............................ 177/2; 364/401; 705/407, 51, 1, 9, 7, 4; 707/530, 500; 709/206; 382/306; 235/375; 713/179

(56) References Cited

U.S. PATENT DOCUMENTS

| | | | | | |
|---|---|---|---|---|---|
| 4,597,330 | A | | 7/1986 | Hill et al. | 101/93.01 |
| 4,926,325 | A | * | 5/1990 | Benton et al. | 705/39 |
| 5,159,180 | A | * | 10/1992 | Feiler | 235/375 |
| 5,329,447 | A | * | 7/1994 | Leedom, Jr. | 705/9 |
| 5,586,037 | A | * | 12/1996 | Gil et al. | 705/407 |
| 5,656,799 | A | * | 8/1997 | Ramsden et al. | 177/2 |
| 5,671,282 | A | * | 9/1997 | Wolff et al. | 713/179 |
| 5,845,256 | A | * | 12/1998 | Pescitelli et al. | 705/4 |
| 5,848,202 | A | * | 12/1998 | D'Eri et al. | 382/306 |
| 5,875,431 | A | * | 2/1999 | Heckman et al. | 705/7 |
| 5,903,646 | A | * | 5/1999 | Rackman | 705/51 |
| 5,944,787 | A | * | 8/1999 | Zoken | 709/206 |
| 5,956,687 | A | * | 9/1999 | Wamsley et al. | 705/1 |

FOREIGN PATENT DOCUMENTS

| | | |
|---|---|---|
| DE | 29605986 U1 | 1/1997 |
| DE | 19735563 A1 | 2/1999 |
| GB | 1466356 | 3/1972 |
| JP | 7331902 | 12/1995 |

OTHER PUBLICATIONS

Schweinitz et al., Republic of Germany, Patent No. DE 296 05 986 U1, issued Mar. 30, 1996 (full English translation).*

Mostofizadeh, Javad, Reducing the Costs of Civil Litigation Using New Technologies [online], [retrieved on Mar. 31, 2000]. retrieved from Internet:<URL:http://www.uschastings.edu/plri/fal95tex/newtech.html>, pp. 1–33, 1995.*

Greenspun, Phillip et al., Making way for intelligence in case space, ACM International Conference on Artificial Intelligence and Law, pp. 96–103, May 1995.*

Asay, Alan, Electronic Filing of Case File Documents, Session No. 103, Fourth National Court Technology Conference (CTC4), pp. 1–5, Oct. 1994.*

Katzenstein, Robert J, Esq., CLAD—Deleware's Paperless Docket, Session No. 103, Fourth National Court Technology Conference (CTC4), pp. 1–7, Oct. 1994.*

The Electronic filing System [online website], Singapore Network Services, [retrieved from the Internet on Mar. 31, 2000], retrieved from Internet:<URL:http://www.asainconnect.com/efs>, pp. 1–8, 1997.*

Adams, Susan, "For sole custody, touch here", [online], Forbes: On The Docket: Divorce, American style, [retrieved from the Internet on Mar. 31, 2000], screenshots retrieved from Internet:<URL:http://www.forbes.com/forbes/97/0707/6001106a.htm>, pp. 1–2, Jul. 1997.*

Automated traffic offence management system, [online website], The Subordinate Courts Of Singapore, [retrieved from the Internet on Mar. 31, 2000], retrieved from Internet:<URL:http://www.gov.sg/judiciary/subct/technology/atoms.html>, pp. 1–2, 1997.*

* cited by examiner

*Primary Examiner*—Joseph H. Feild
*Assistant Examiner*—William L. Bashore
(74) *Attorney, Agent, or Firm*—Ronald Reichman; Angelo Chaclas

(57) ABSTRACT

An automated court docketing system that supplies evidence of the time and date that a document was filed with the court. This invention also processes and accepts payment and generates a receipt reflecting the date/time of submission and payment of the required fees. When needed, a docket number is supplied.

21 Claims, 8 Drawing Sheets

AUTOMATED COURT DOCUMENT DOCKETING FILING SYSTEM

CROSS REFERENCE TO RELATED APPLICATIONS

Reference is made to commonly assigned co-pending patent applications: Ser. No. 09/058,025 filed herewith entitled "Electronic Automated Court Document Docketing Filing System" in the name of Patrick D. Mahoney, Terrence M. Doeberl, Ronald P. Sansone and Ronald Reichman.

FIELD OF THE INVENTION

The invention relates generally to the field of filing systems and more particularly to automated docketing systems.

BACKGROUND OF THE INVENTION

Governments have created judicial systems for administering justice by resolving disputes between parties. In the United States, each state and the federal government has its own judicial system. The federal and state courts dispense justice in as fair and efficient manner as is possible. The caseload of the federal Judiciary increased in fiscal year 1997, reaching historic levels in nearly every category. For instance, filings in: the twelve regional courts of appeals rose 1 percent to 52,319; the district courts rose 2 percent to 322,390 and; the bankruptcy court filings climbed 23 percent to 1,367,364. The state courts are also experiencing an increase in new case filings. The increase in case filings is making it more difficult for the judiciary to decide cases in a timely manner.

In a typical United States District Court civil filing, a party called the plaintiff presents a document called a complaint to the court clerk. The court clerk reviews the complaint and advises the plaintiff of the required fee. Then the plaintiff pays the specified fee to the clerk. At this point the top page of the complaint may be rubber stamped with a docket number and/or date/time stamped by the clerk and a receipt is given to the plaintiff, if requested. The clerk also records the payment of the filing fee in a ledger and processes the complaint. After the defendant receives a copy of the complaint, the defendant files an answer to the complaint with the court. During the discovery process, the plaintiff and the defendant may file many motions with the court. The plaintiff and defendant may also file motions with the court during pre-trial proceedings. After the trial, the parties may be entitled to file post trial motions. It is not uncommon in some lawsuits for the parties to have over two hundred separate document filings.

Most papers that are filed with the court have to be submitted within specified time periods. Most filings contain many pages. Exhibits containing many pages may also be attached to the filings. Typically, only the first page of a filing contains the docket number and the time the filing was submitted to the court.

One of the problems encountered by the prior art is that sometimes it is difficult to read the rubber stamped docket number. This may cause papers to be filed with the wrong case or the improper docket number to be placed on future filings.

Another problem encountered by the prior art is that an attorney's office may place an improper docket number on a filing, which causes that filing to be filed in another case. The clerk may also misread the docket number and file the paper in the wrong case.

An additional problem encountered by the prior art is that the filing of papers in a court is a complex, manual fragmented process in which many papers have to be received, paid for and entered into the court system.

The bankruptcy court is trying to make it easier for parties to submit petitions and other documents to the court. This is being accomplished by allowing the parties to submit petitions and other documents in an after hours depository. The forgoing does not provide the filer with a receipt that reflects the time of his/her submission to the court or a receipt indicating payment. To facilitate the above type of filing, the Court has previously provided access to a time/date stamping machine to reflect the date and time of his submission to the court. This service was withdrawn after episodes of inadvertent or deliberate filing errors.

An additional problem encountered by the prior art is that a document may be stamped with the incorrect date/time and the actual document may be submitted after the filing deadline for that particular document.

Another problem encountered by the prior art is that the date/time stamp is on the wrong document due to inadvertent error by the filer or clerk.

A further problem encountered by the prior art is that there may be inaccurate fee submission.

SUMMARY OF THE INVENTION

This invention overcomes the disadvantages of the prior art by providing an automated court docketing system that supplies evidence of the time and date that a document was filed with the court. This invention also processes and accepts payment and generates a receipt reflecting the date/time of submission and payment. When needed, a docket number is supplied. The foregoing is advantageous to the court because the court knows the exact date and time that the document was filed. The processing of payment also relieves the court of an administrative burden. The above is advantageous to the party because the party has proof of the actual date and time that the document was filed and the fee paid.

An additional advantage of this invention is that it provides more accurate reporting and checking of the fees received by the court.

It would be obvious to one skilled in the art that any government agency, government department or private organization may use the docketing system of this invention.

DETAILED DESCRIPTION OF THE PREFERRED EMBODIMENT

Figure 1:
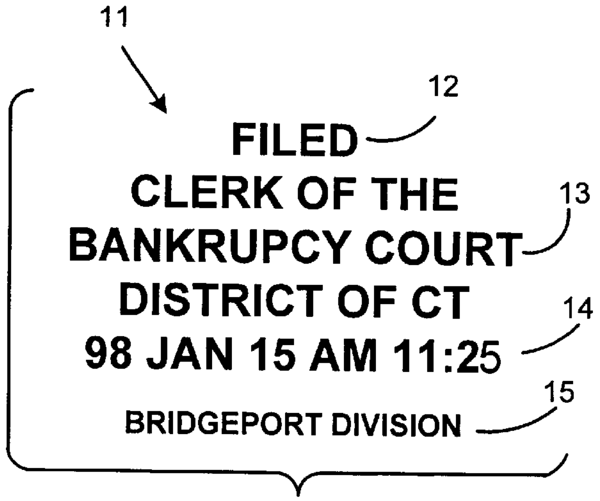
FIG. 1 ( PRIOR ART )
FIG. 1 is a drawing of a prior art court date/time stamp.

Referring now to the drawings in detail, and more particularly to FIG. 1, the reference character 11 represents a prior art court date/time stamp. The court date/time stamp 11 contains a indication 12 that a document was filed, the title and name of the court 13 that received the filing, the date/time 14 that the filing was made and the division of the court 15 that received the filing.

Figure 2:
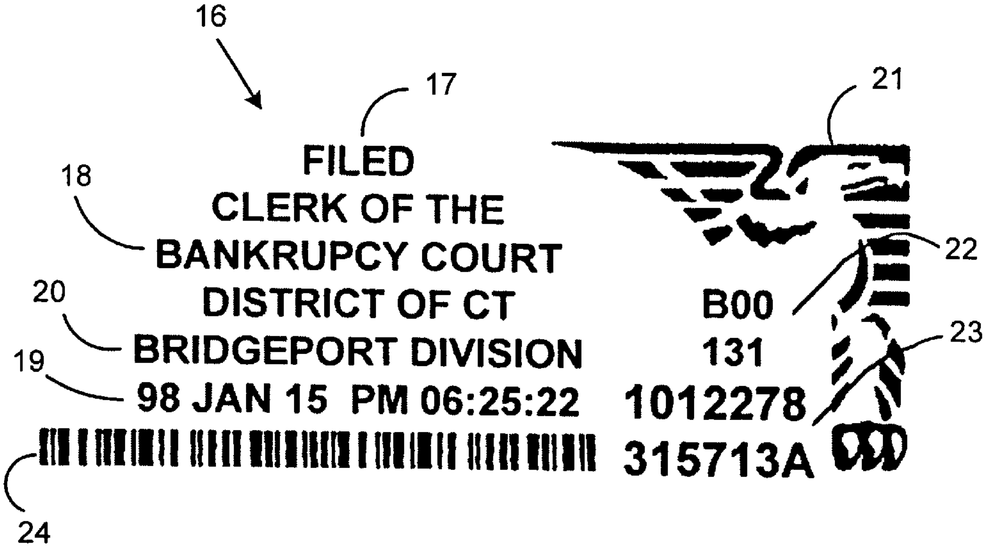
FIG. 2 is a drawing of the date/time stamp 16 of this invention.

FIG. 2 is a drawing of the date/time stamp 16 of this invention. The date/time stamp 16 contains: an indication 17 that a document was filed; the title and name of the court 18 that received the filing; the date/time 19 that the filing was made; the division of the court 20 that received the filing; a graphic identification symbol 21; a meter identification number 22; a unique encrypted identification number 23; and a bar code 24, that is the bar code equivalent of number 23. Number 23 may be obtained by encrypting the combination of the meter identification number 22 with the date and time of filing 19. Any encryption process may be utilized to encrypt number 23, i.e., Digital Encryption Standard (DES).

Figure 3:
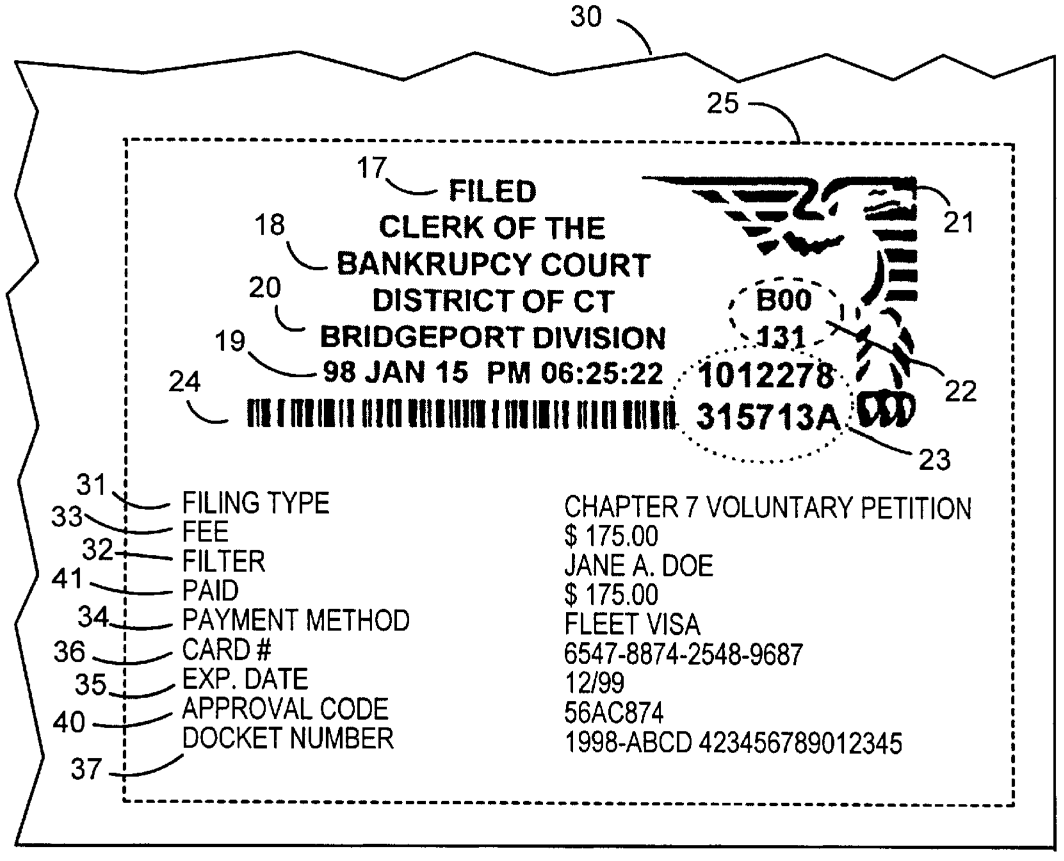
FIG. 3 is a drawing showing the date/time/payment/docketing stamp 25 affixed to a document 30.

FIG. 3 is a drawing showing the date/time/payment/docketing stamp 25 affixed to the first page of a document 30. The date/time/payment/docketing stamp 25 contains: an indication 17 that a document was filed; the title and name of the court 18 that received the filing; the date/time 19 that the filing was made; the division of the court 20 that received the filing; a graphic identification symbol 21; a meter identification number 22; a unique encrypted identification number 23; and a bar code 24 that is the bar code equivalent of number 23; the type of filing 31; the filer 32; the required fee 33; the method of payment 34; the expiration date 35 of the credit card or debit card used; the credit card or debit card number; the approval code 40; the amount actually paid 41; and the docket number 37. Docket number 37 may include the year in which the document is being filed (e.g., 1998), four alphabetic characters that indicate the court in which the document is being filed, and fifteen numbers that indicate the number of the document being filed.

Figure 4:
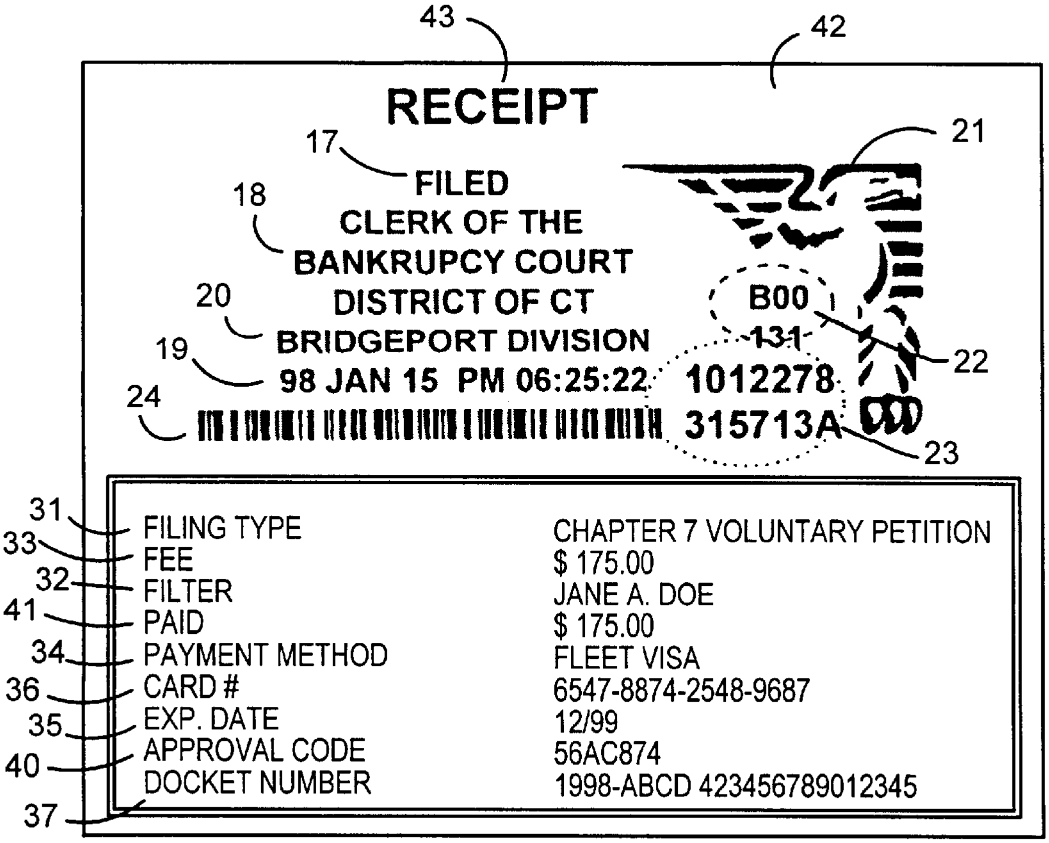
FIG. 4 is a drawing showing the date/time/payment/receipt stamp 42 that the filer receives.

FIG. 4 is a drawing showing the date/time/payment/receipt stamp 42 that the filer receives. Other than the term receipt 43, the information contained in receipt 42 is the same as the information contained in stamp 25.

Figure 5:
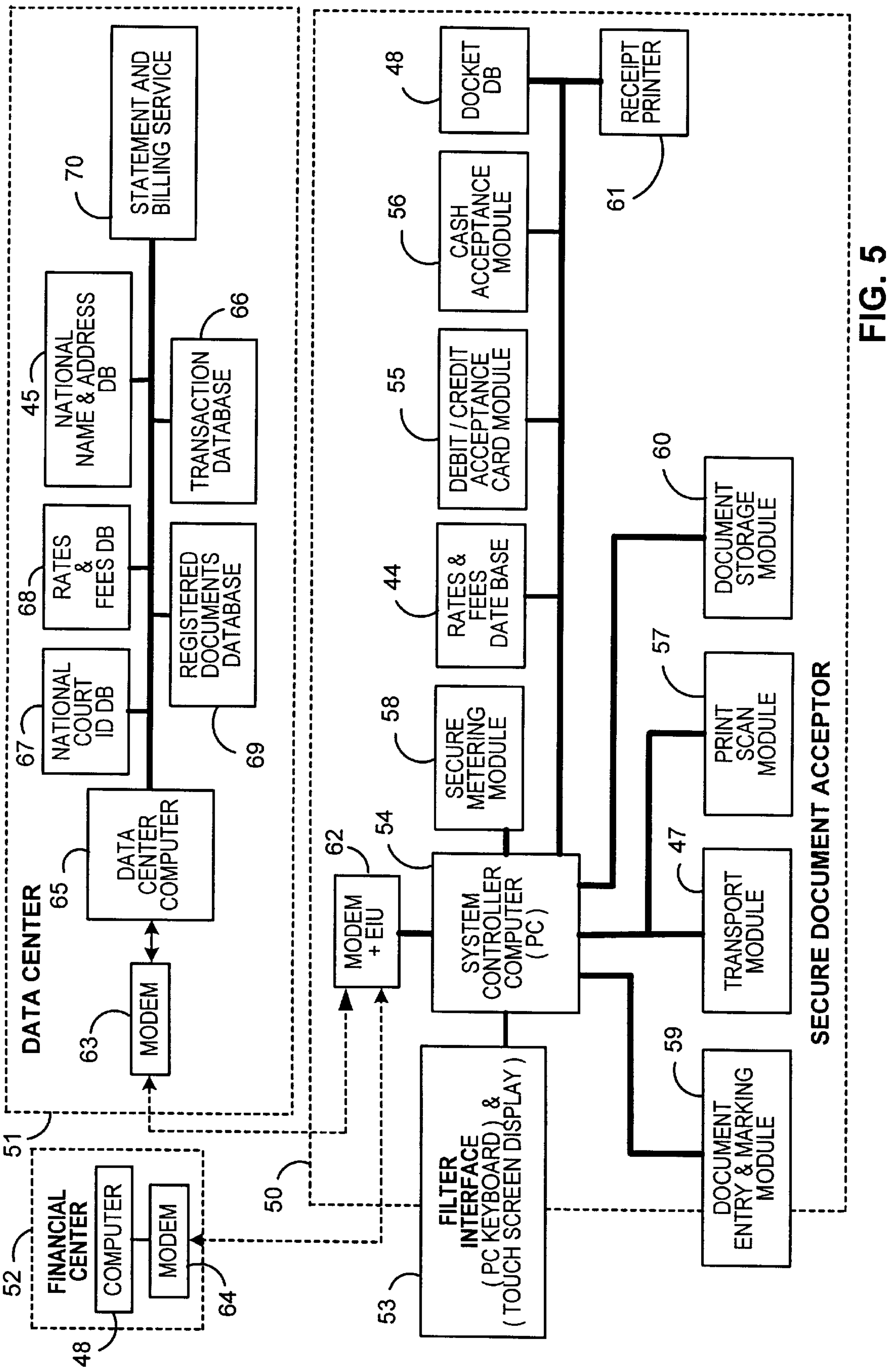
FIG. 5 is a block diagram of the system of this invention.

FIG. 5 is a block diagram of the system of this invention. The system comprises: a secure document acceptor 50; a data center 51; and a financial center 52. Secure document acceptor 50 comprises: a filer interface 53 that includes a personal computer keyboard and a touch screen display; a computer/systems controller 54 that is coupled to interface 53; a debit/credit card module 55 that is coupled to controller 54; a cash module 56 that is coupled to controller 54; a document scanner 57 that is coupled to controller 54; a secure metering module 58 that is coupled to controller 54; a document marking and holding module 59 (which includes a printer) that is coupled to controller 54, module 59 will be more fully described in the description of FIG. 6; a document storage module 60 that is coupled to controller 54, a transport module 47 that is coupled to controller 54; current rates and fees data base 44 that is coupled to controller 54; a docket data base 48 (which contains all of the previously used docket numbers and a list of docket numbers that may be used) that is coupled to controller 54; a receipt printer 61 that is coupled to controller 54; and a data link 62 (data link 62 includes an Electronic Interface Unit [EIU] and a modem) that is coupled to controller 54 and modems 63 and 64. Documents are moved from module 59 to module 60 after printer 78 (FIG. 6) affixes stamp 25 to a document 30 (FIG. 3). It would be obvious to one skilled in the art that printers 78 and 61 may be combined into one printer that performs the tasks of printers 78 and 61. An example of data link 62 is the B900 Data Link Electronic Interface Unit manufactured by Pitney Bowes of Stamford, Conn.

The components of metering module 58 are contained in a secure enclosure that includes physical interlocks or sensors that prevent unauthorized personnel from tampering with the components of metering module 58. The secure enclosure may be constructed in accordance with United States Federal Information Processing Standard No. 140-1, herein incorporated by reference. Metering module 58 includes an ascending register and a descending register. The ascending register maintains a record of all the fees affixed by the metering module 58 to documents 30 (described in the description of FIG. 3) and the descending register maintains a record of the amount of fees that has been purchased by the filers of documents 30. Each fee transaction performed by metering module 58 is communicated to system controller 54. Controller 54 classifies the transactions of metering module 58 into various categories. Some of the categories are: the court in which the fee was paid; the location of the court in which the fee was paid; the type of document filed; and the fee for filing the document. The data from the transactional categories are then stored in data link 62. It would be obvious to one skilled in the art that the transactions may be classified into many other different categories.

Document scanner 57 is used to scan the top page of a document 30 to produce a user replica of the top page of document 30. Scanner 57 may also be used to scan receipt 42 if error conditions exist during the cash acceptance process.

Acceptor 50 also contains a debit/credit card module 55 and a cash module 56 for receiving bills. The manner in which modules 55 and 56 operate are well known in the art.

Data center 51 comprises: a modem 63; a data center computer 65 that is coupled to modem 63; a payment data base 66 that is coupled to computer 65; a court data base 67 that is coupled to computer 65; a rates and fees data base 68 that is coupled to computer 65; a registered documents data base 69 that is coupled to computer 65; a universal name and address directory 45 (that contains current names and addresses for most of the people in the United States); and a statement and billing services 70 that is coupled to computer 65. Funds data base 66 maintains a record of all credit card funds, debit card funds and currency collected by each court. Each court location that collects funds will have its own listing. Court data base 67 maintains a listing of all court locations. The rates and fees data base 68 list the fees required for the courts services. The registered documents data base 69 lists all information pertaining to the document accepted by acceptor 50. A universal directory is sold by Pitney Bowes Inc. of Stamford, Conn. under the trade name ReUnion.

The statement and billing services 70 produces periodic statements for the services performed by data center 51.

Financial center 52 is a bank or credit card center that comprises: a modem 64 that communicates with a computer 48.

Figure 6:
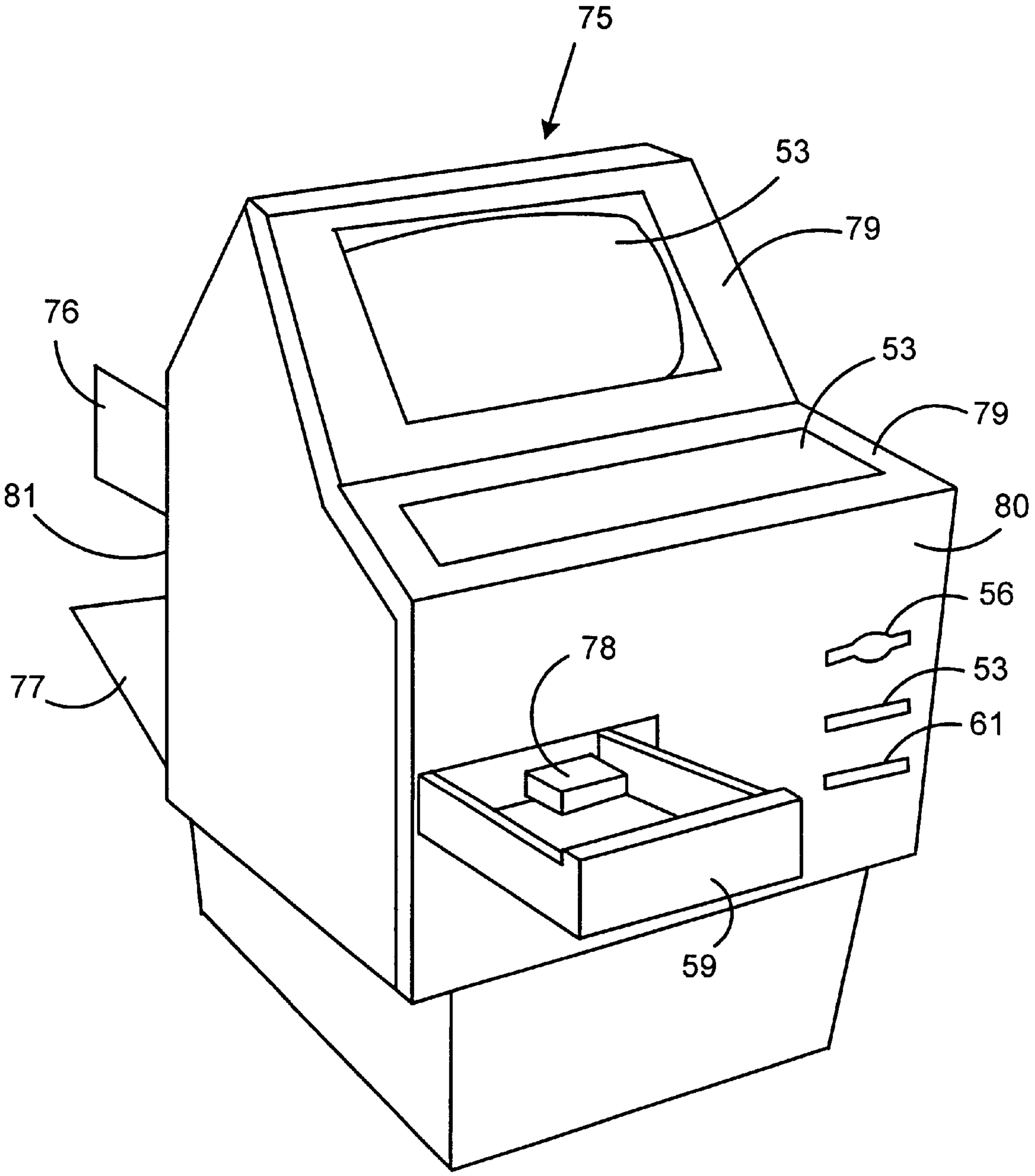
FIG. 6 is a perspective drawing of the housing that contains document acceptor 50 of FIG. 5.

FIG. 6 is a perspective drawing of housing 75 that contains document acceptor 50 of FIG. 5. The display and keyboard of filer interface 53 is shown on top surface 79 of housing 75. Module 56, debit/credit card module 55, receipt printer 61 and document receiving and marking modules 59 are shown on front surface 80. Document receiving and marking module 59 includes a drawer that is capable of being pushed into the interior of housing 75 and pulled out of the interior of housing 75. Module 59 contains a printer 78 that is used to print date/time/payment/docketing stamp 25 on document 30 (described in the description of FIG. 3). Funds access drawer 76 and document access drawers 77 are connected to rear panel 81 of housing 75.

The user of system 50, i.e., the person filing the paper enters information regarding the document to be filed, i.e., type of filing, filers name, the fee due, method of paying the fee, expiration date of the card used to pay the fee, if required, etc., into interface 53. Relevant information regarding the document to be filed is displayed on the display of interface 53. The filer pays the required fee by placing cash in module 56 or placing a credit card or debit card in module 55. After the required fee is received and a notice is placed on the display of interface 53, the filer places the document to be filed in module 59 and closes the drawer of module 59. Module 59 is now locked. Then controller 54 (FIG. 5) formats stamp 25, stamp 25 is imprinted on the top sheet of the document placed in the drawer of module 59. Printer 61 then prints a receipt 42 for the above filing. At this point document scanner 57 may be used to scan the top page of document 30 to produce a user replica of the top page of document 30. Scanner 57 may also be used to scan receipt 42 if error conditions exist during the cash acceptance process. The document in which stamp 25 is affixed is now moved to document storage module 60. The document may be moved from module 59 to module 60 by transport module 47. Module 47 may be a belt connected to a motor. It would be obvious to one skilled in the art that other methods may be used by module 47 to move the document from module 59 to module 60. At a subsequent time an authorized representative of the court opens locked doors 76 and 77 and removes the filed papers and monies collected.

If sufficient fees are not received for the filing, a notice will appear on the display of interface 53, stamp 25 and receipt 42. The notice will indicate that the fee has not been fully paid. The notice will also inform the filer of ways in which he/she can pay the fee.

Articles like books, tapes etc. may be returned to their owner or filed with an organization by using the apparatus of this invention. The foregoing may be accomplished by attaching a surface that can be printed on, like a piece of paper, to the top surface of the article and depositing the article in module 59, and entering relevant information via interface 53.

Figure 7:
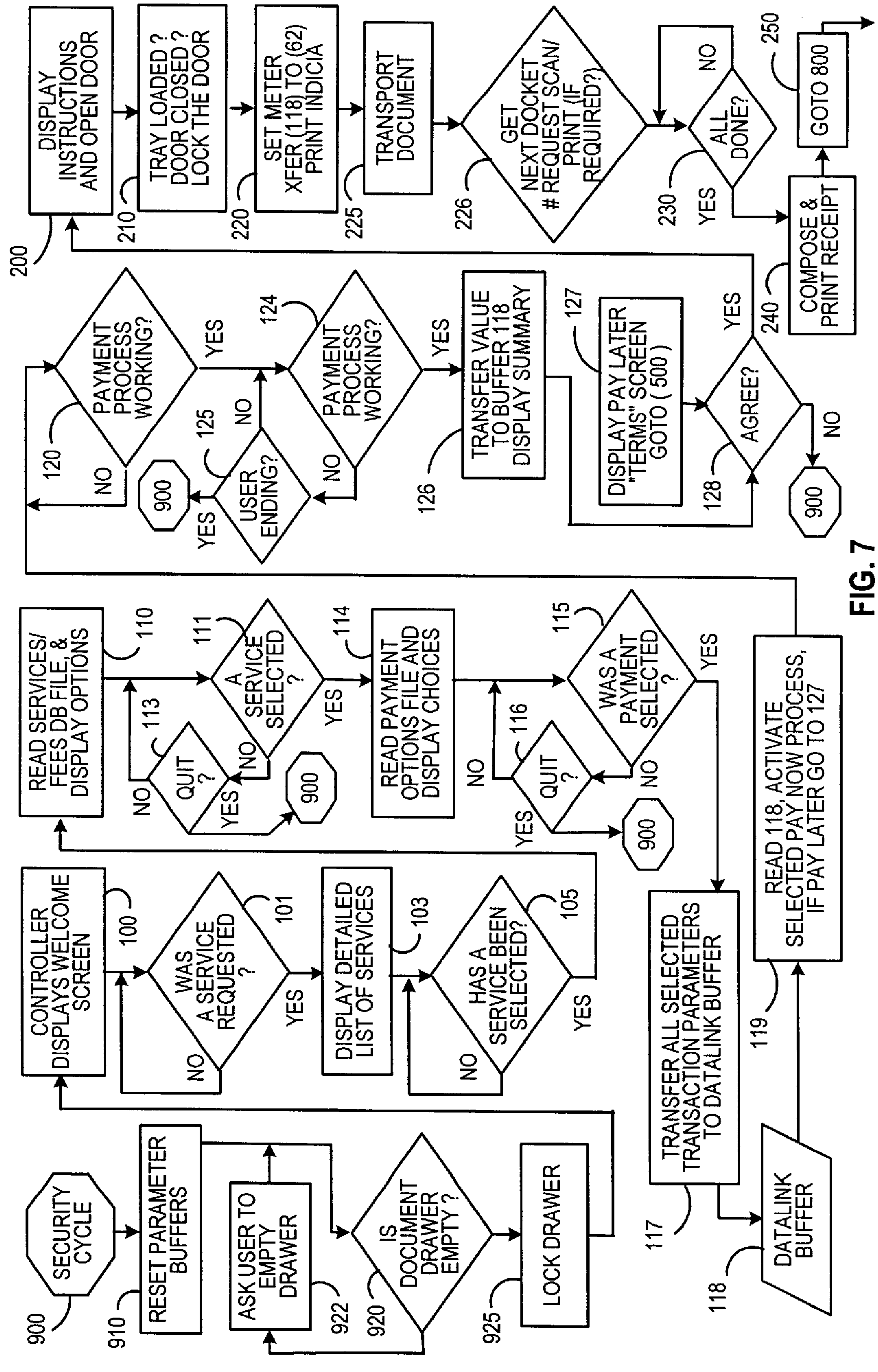
FIG. 7 is a drawing of a flow chart of the program contained in system controller 54 of FIG. 5.

FIG. 7 is a drawing of a flow chart of the program contained in system controller 54 of FIG. 5. The program begins in block 100, where controller 54 (FIG. 5) displays a welcome message on the display of interface 53. Then the program goes to decision block 101. Decision block 101 determines whether or not a service has been requested. If a service has not been requested, the program goes back to the input of block 101. If a service has been requested, the program proceeds to block 103. Block 103 displays a detailed list of services, i.e., find a docket number, verify a receipt, etc. Now the program goes to decision block 105. Decision block 105 determines whether or not a service has been selected. If a service has not been selected, the program goes back to the input of block 105. If a service has been requested, the program proceeds to block 110.

In block 110 the program reads the current rates and fees data base 44 and displays the filing options on the display of interface 53. At this point the program goes to decision block 111. Decision block 111 determines whether or not a service has been selected. If a service has not been selected, the program goes to the input of block 113. Block 113 determines whether or not the filer wants to quit this program. If the filer wants to quite this program the program goes to block 900 security cycle. If the filer does not want to quit this program, the program goes back to the input of block 111. If a service has been selected the program proceeds to block 114. Block 114 reads the payment options and shows the choices on the display of interface 53, i.e., cash, debit card, credit card. Then the program goes to decision block 115 to determine whether or not a method of payment was selected. Decision block 115 determines whether or not a method of payment has been selected. If a method of payment has not been selected, the program goes to the input of bock 116. Block 116 determines whether or not the filer wants to quit this program. If the filer wants to quit this program, the program goes to block 900 security cycle. If the filer does not want to quit this program, the program goes back to the input of block 115. If a method of payment has been selected the program goes to block 117.

Figure 9:
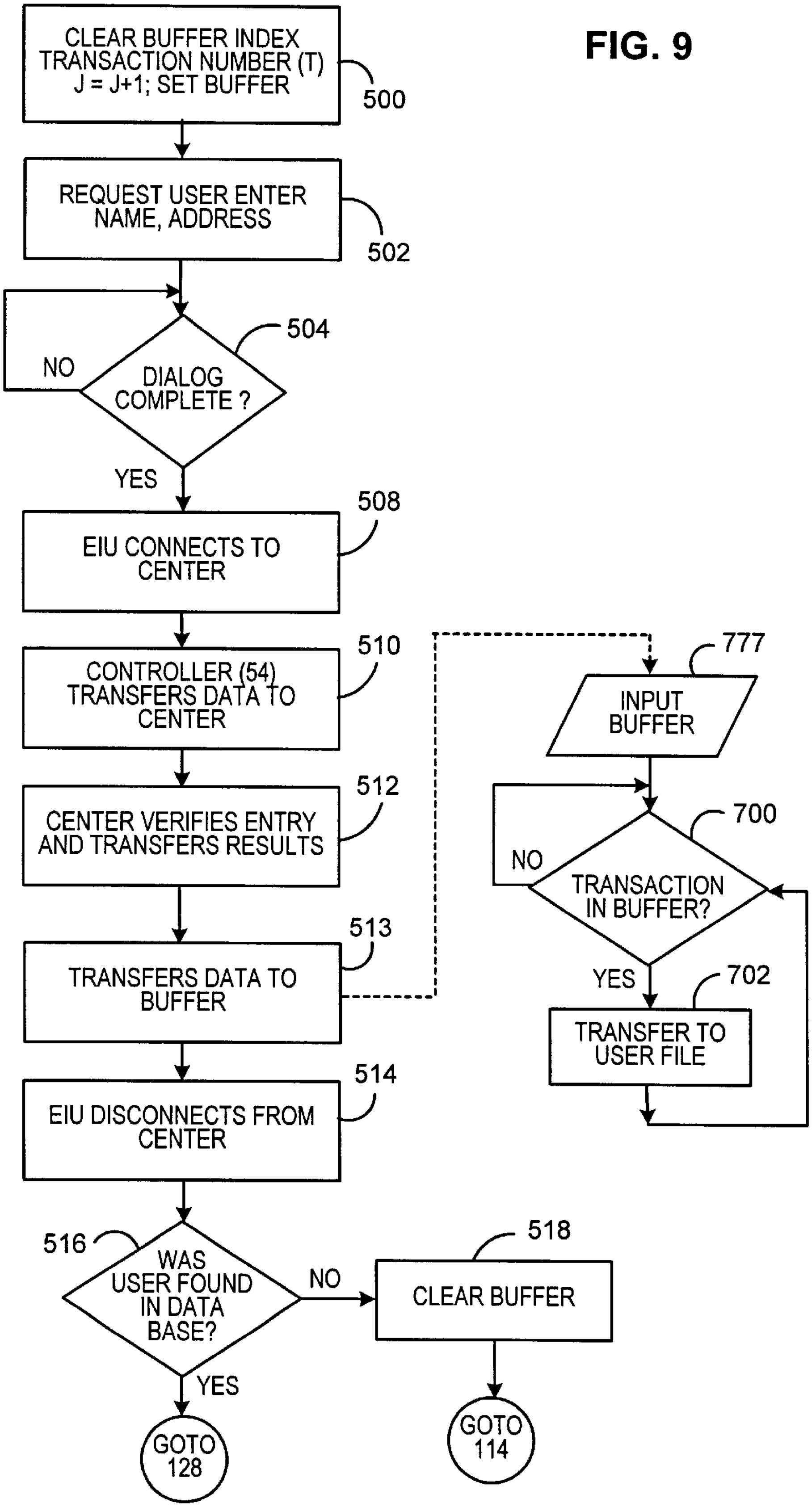
FIG. 9 is a drawing of a flow chart showing the manner in which data center computers 65 deals with someone who decides to pay for the filing at a later date.

Block 117 transfers the selected transaction parameters to data link 62. Then the program goes to block 118 to transfer the contents of block 117 to the memory of data link 62. Now the program goes to block 119 to read to data link 62 and begin the payment process. If the filer selected pay later, the program would go to block 127. Block 127 would show the pay later terms on the screen of the display of interface 53 and then the program would go to block 500 (FIG.9). If the filer did not select the pay later option in block 119, the program would go to decision block 120.

Block 120 determines whether or not the payment process is working. If block 120 determines that the payment process is not working, then the program goes back to the input of block 120. One of the components of the payment process is to verify that the name and address appearing on the filed document matches the name and address in national name and address data bases 45. If block 120 determines that the payment process is working, then the program goes to the input of decision block 124. Decision block 124 determines whether or not the payment process was successful. If block 124 determines that the payment process was not successful, the program goes to the input of decision block 125. Block 125 determines whether or not the filer wants to end this program. If the filer wants to end this program, the program goes to block 900 security cycle. If the filer does not want to end this program, the program goes back to the input of block 124. If the payment process is successful, the program goes to block 126..

Block 126 transfers the value of the money credited for the filing of this document to block 118, i.e., the volatile memory of secure meter module 58. The money credited information is also shown on the display of interface 53. At this point the program goes to decision block 128. Decision block 128 determines whether or not the filer agrees with the money credited information or with the terms of future payment of the filing fee.

If the filer does not agree with the terms of future payment, the program goes to block 900 security cycle. Then the program goes to block 910 to reset the parameters in block 118, i.e., data link 62. Now the program goes to decision block 920. Decision block 920 determines whether or not the drawer in module 59 is empty. If the drawer in module 59 is not empty, the program goes to block 922. Block 922 asks the user to empty the drawer of module 59 by showing a message on the display of interface 53. Then the program goes back to the input of decision block 920. If block 920 determines that the drawer of module 59 is empty, the program proceeds to block 925 to lock the drawer of module 59. Now the program goes back to the input of block 100.

If decision block 128 determines that the filer agrees with the money credited information or with the terms of future payment the program goes to block 200. Block 200 shows instructions on the screen of the display of interface 53. An example of the aforementioned instructions are "place the document you wish to file face up in the drawer of module 59". Then the program goes to block 210 to wait for the placing of the document to be filed in the drawer of module 59 and the closing of the drawer of module 59. After the drawer of module 59 is closed, the program causes the drawer of module 59 to be locked. Now the program goes to block 220 and prints stamp 25 on the top page of document 30.

At this point the program goes to block 225 to request transport module 47 to transport document 30 from module 59 to document storage module 60. Then the program goes to decision block 226. Block 226 obtains, if requested, the next docket number from docket data base 48 and prints this docket number, if required, within the space provided in stamp 25, i.e., docket number 37. Now the program proceeds to decision block 230. Block 230 determines whether or not the functions performed in blocks 200 to 226 have been completed. If block 230 determines that the functions performed in blocks 200 to 226 have not been completed, the program goes back to the input of block 230. If block 230 determines that the functions performed in blocks 200 to 226 have been completed, the program goes to the input of block 240. Block 240 composes receipt 42 and causes printer 61 to print receipt 42. Then the program goes to block 250 and then to block 800 (FIG. 8).

Figure 8:
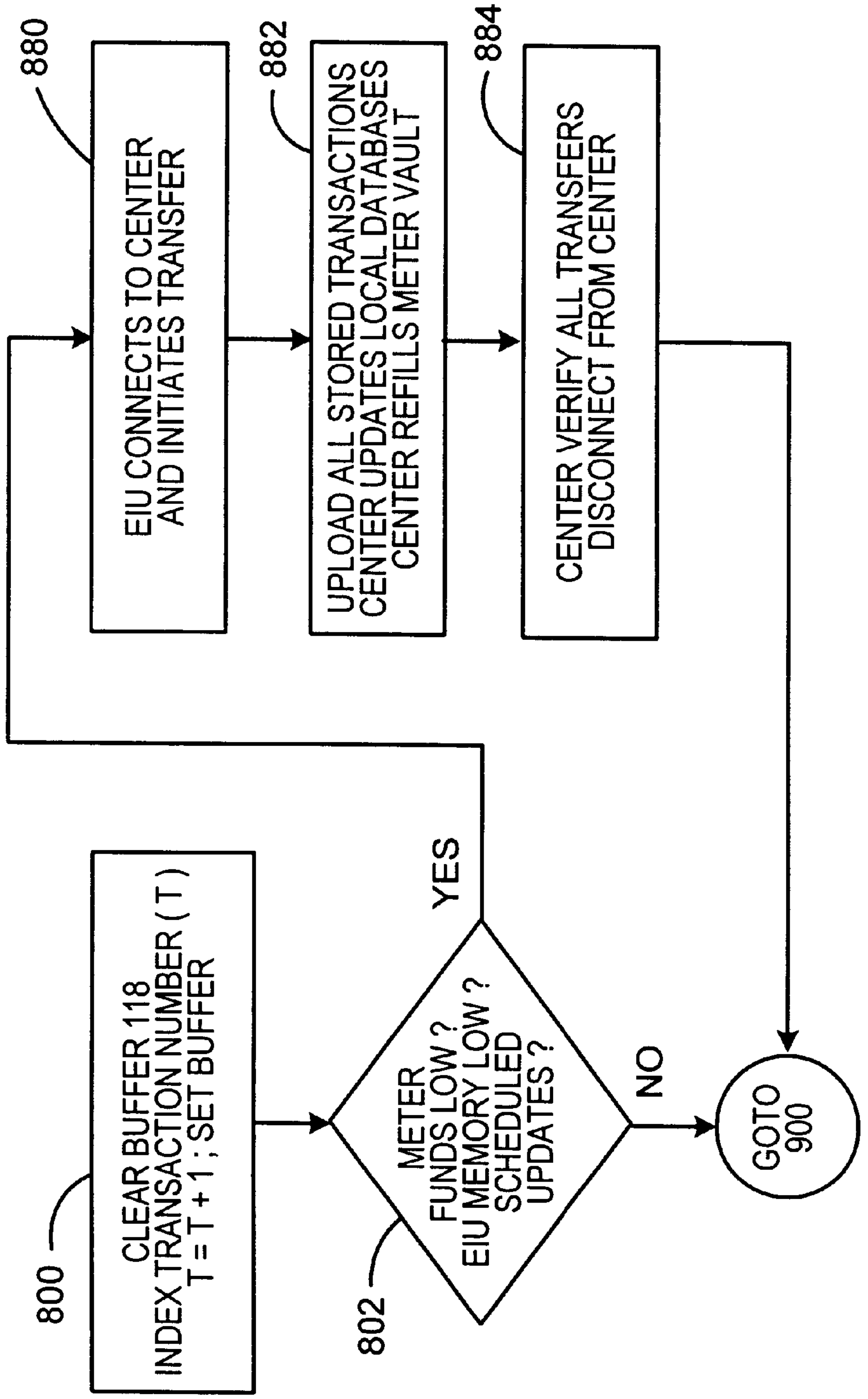
FIG. 8 is a drawing of a flow chart showing the interaction of data center computer 65 with system controller 54 and data link 62.

FIG. 8 is a drawing of a flow chart showing the interaction of data center computer 65 with system controller 54 and data link 62. In block 800 the buffer of data link 62 is cleared and then the buffer in data links 62 is set to T=T+1, where T equals the index transaction number. Then the program goes to decision block 802. Block 802 determines whether or not need meter modules 58 is low or data link 62 or rates and fees data base 44 needs to be updated. If block 802 determines that meter module 58 is not low or the above databases do not need updating, the program goes to block 900 (FIG. 7). If block 802 determines that meter module 58 is low or the above data bases need updating, the program goes to block 880. Block 880 connects data link 62 to data center computer 65. Then the program goes to block 882 to upload all stored transactions center updates and refill meter 58. The program goes to block 884 to verify all transfers of information to data center computer 65. Then data links 62 is disconnected from data center computer 65. At this point program goes to 900 (FIG. 7).

FIG. 9 is a drawing of a flow chart showing the manner in which data center computers 65 deals with someone who decides to pay for the filing at a later date. In block 500 the buffer of controller 54 is cleared and then the buffer in controller 54 is set to J=J+1, where J equals the index transaction number. Then the program goes to block 502 to request that the user enter his name and address into interface 53. Now with the program goes to decision block 504. Decision block 504 determines whether or not the dialogue between the user and interface 53 is complete. If block 504 determines that the dialogue between the user and interface 53 is not complete, the program goes back to the input of block 504. If block 504 determines that the dialogue between the user and interface 53 is complete, the program goes to the input of block 508. Block 508 connects data link 62 to data center computer 65 via modem 63. Then the program goes to block 510 where controller 54 transfers data in controller 54 data to data center computer 65. At this point the program goes to block 512 where data center computer 65 verifies the data entry and transfers the results to controller 54. Then the program goes to block 513 to transfer data to the buffer of controller 54. At this point the program goes to block 514 to disconnect data link 62 from data center computer 65 and to block 777 to input the data in transition data buffer 66.

Then the program proceeds to decision block 514 to determine whether or not the user's name was found In data base 45. If block 516 determines that the user's name was found in data base 45 then the program goes to block 128. If block 516 determines that the users name was not found in data base 45 then the program goes to block 518 to clear the buffer in controller 54. Then the program goes to block 114.

The program goes from block 777 to decision block 700. Decision block 700 determines whether or not had the transaction in transaction data base 66 are complete. If block 700 determines that the transactions are not complete, the program goes back to the input of block 700. . If block 700 determines that the transactions are complete, the program goes to block 702. Block 702 transfers the user file in data base 66.

The above specification describes a new and improved automated docketing system. It is realized that the above description may indicate to those skilled in the art additional ways in which the principles of this invention may be used without departing from the spirit. It is, therefore, intended that this invention be limited only by the scope of the appended claims.

What is claimed is:

1. A computer-controlled system for docketing documents, said system comprising:

a housing located at a site;

means for depositing a document in the housing;

means for printing filing information on the document that indicates the date and time the document was placed in the housing;

means for printing information on a receipt that indicates the date and time the document was placed in the housing;

means coupled to the computer for paying for the filing of the various documents;

means coupled to the computer, the document filing information means and the document receipt printing means for obtaining a unique docket number which comprises:

means for obtaining an identification number of the housing located at a site;

means for combining the identification number with the date and time of filing the document;

means coupled to the combining means for encrypting the combined identification number with the date and time of filing, wherein the unique docket number, name of party filing the document, method for payment for the filing, and type of filing are stored in the computer and printed on the top page of the document by the document filing information means, and the unique docket number, name of party filing the document, method for payment of the filing and type of filing are printed on the receipt by the receipt printing means; and a scanner and printer coupled to the computer and the document to produce a user replica of the now marked top page of the document.

2. The system claimed in claim 1, further including:

a computer coupled to the document filing information means and the document receipt printing means, wherein the computer stores the date and time the document was placed in the housing.

3. The system claimed in claim 2, further including:

means for entering information about the document into the computer.

4. The system claimed in claim 3, further including:

means for entering information about a party filing the document into the computer.

5. The system claimed in claim 2, wherein the document comprises: various types of documents that require different fees.

6. The system claimed in claim 5, further including:

means coupled to the computer for listing the fee required to file various documents.

7. The system claimed in claim 6, wherein the paying means comprises:

a cash module.

8. The system claimed in claim 6, wherein the paying means comprises:

a credit card module; and a credit card center that is coupled to the credit card module, wherein the credit card center approves payment of the required fee.

9. The system claimed in claim 6, wherein the paying means comprises:

a debit card module; and a debit card center that is coupled to the credit card module, wherein the debit card center debits payment of the required fee.

10. The system claimed in claim 6, further including:

means for obtaining a unique number that is printed on the document by the document filing information means and on the receipt by the document receipt printing means.

11. The system claimed in claim 6, further including:

a scanner coupled to the computer and the receipt to produce a replica of the receipt.

12. The system claimed in claim 6, wherein the document comprises:

an article having a top surface; and means for attaching a surface that may be printed on to the top surface of the article.

13. The system claimed in claim 6, further including a data center that is coupled to the means for listing the fees to update the fees as required.

14. The system claimed in claim 1, further including a secure container; and means for transporting a document from the housing to the secured container.

15. The system claimed in claim 1, wherein the housing, the means for depositing, the document filing information means and the document receipt printing means are located at a plurality of sites and means located at a data center for determining whether a filer has been adequately identified wherein the data center comprises:

a data center computer that is coupled to the computers located at a plurality of sites so that information is exchanged between the data center and the plurality of sites to check the address of the filer, wherein the data center computer has a list that indicates the location of the sites and a national name and address data base.

16. The system claimed in claim 15, wherein the data center computer stores the information printed on the receipts and on the documents at the sites.

17. The system claimed in claim 16, wherein the data center computer stores the information appearing on the page of the documents at the sites.

18. The system claimed in claim 1, wherein the housing is secure.

19. A method for docketing documents, the method includes the steps of:

depositing a document at one of a plurality of secure sites that have an identification code;

printing filing information on the document that indicates the date and time the document was placed at one of the sites;

printing information on a user receipt that indicates the document was placed at one of the sites;

storing the date and time that the document was placed at one of the sites at the site that the document was deposited;

paying for the docketing of the document;

combining the identification code and the date and time the document was placed at one of the sites to form a unique number; encrypting the unique number;

printing the unique, encrypted number, the name of the party filing the document, the method for payment for filing the document, and type of filing on the document;

printing the unique, encrypted number, the name of the party filing the document, the method for payment for filing the document, and type of filing on the receipt; and scanning a top page of the document to provide a user replica of the document.

20. The method claimed in claim 19, further including the step of:

storing the unique number, the unique docket number and paying for the document at the site that the document was deposited.

21. The method claimed in claim 20, further including the steps of:

transferring the unique number, the unique docket number, the paying for the document, and the date and time of depositing to the data center.

* * * * *